Dec. 3, 1935.　　　S. L. GOLDSBOROUGH　　　2,023,070

PROTECTIVE SYSTEM

Filed June 10, 1932　　　2 Sheets-Sheet 1

WITNESSES:

INVENTOR
Shirley L. Goldsborough
BY
ATTORNEY

Dec. 3, 1935.        S. L. GOLDSBOROUGH         2,023,070
PROTECTIVE SYSTEM
Filed June 10, 1932          2 Sheets-Sheet 2

WITNESSES:
E. A. McCloskey
Geo. O. Harrison

INVENTOR
Shirley L. Goldsborough.
BY
ATTORNEY

Patented Dec. 3, 1935

2,023,070

UNITED STATES PATENT OFFICE 2,023,070

PROTECTIVE SYSTEM

Shirley L. Goldsborough, East Orange, N. J., assignor to Westinghouse Electric & Manufacturing Company, East Pittsburgh, Pa., a corporation of Pennsylvania Application June 10, 1932, Serial No. 616,471

12 Claims. (Cl. 175—294)

My invention relates to protective apparatus for use in electrical systems and particularly to means for protecting electrical transforming apparatus such as transformers, rotary converters, frequency changes or power rectifiers, constituting part of the connected load of a circuit provided with apparatus for protecting the circuit as a whole.

Although not limited thereto, my invention is particularly applicable to the protection of transformers supplied in parallel from a feeder provided with over-current or impedance protective apparatus.

It is an object of my invention to provide novel and simple differential protective apparatus for a transforming device constituting part of the connected load of a circuit provided with apparatus for protecting the circuit as a whole, which shall operate to create an abnormal circuit condition of the circuit as a whole to thereby operate the main protective apparatus upon the occurrence of a fault in the transforming device.

A further object of my invention is to provide protective apparatus for a transformer constituting part of the connected load of a feeder, which shall operate to ground the feeder upon the occurrence of a fault in the transformer.

Other objects of my invention will become evident from the following detailed description taken in conjunction with the accompanying drawings in which.

Figure 1:
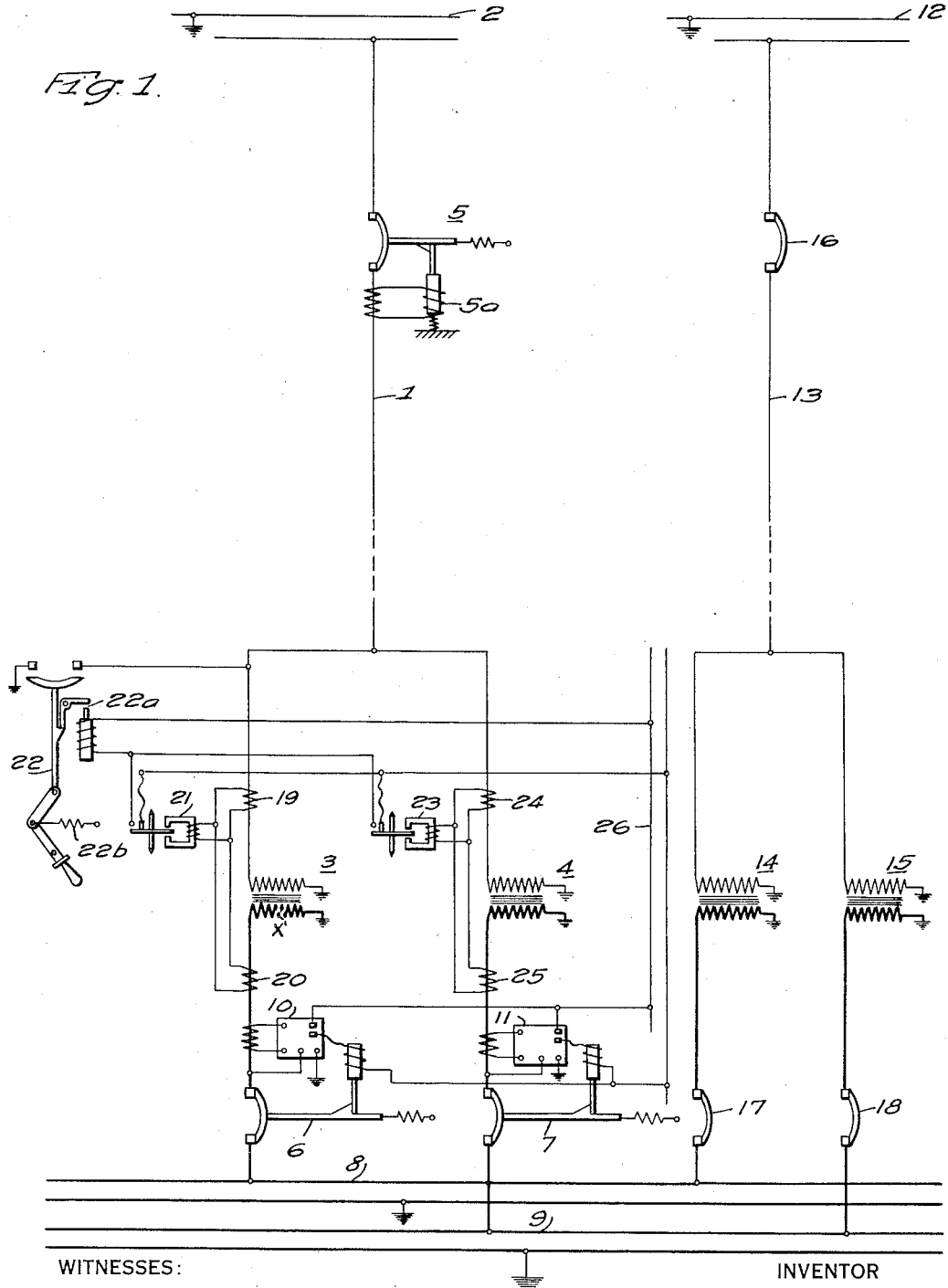
Figure 1 is a diagrammatic view of a protective system embodying my invention.

Referring to Fig. 1 of the drawings, a feeder 1 is provided for transmitting power from a high voltage supply circuit 2 to the high-voltage windings of a pair of transformers 3 and 4. The feeder 1 is provided with a circuit breaker 5 having a fault responsive device 5a for opening the circuit breaker in response to abnormal circuit conditions of the feeder 1. For simplicity, I have illustrated the circuit breaker 5 as of the over-current trip type, but it will be understood that the device 5a may be of more complicated form to respond to various abnormal conditions of the circuit 1, with or without time delay, in a manner well known in the art.

The low voltage windings of the transformers 3 and 4 are connected through a pair of network switches 6 and 7 to a pair of distribution circuits 8 and 9 respectively. The network switches 6 and 7 are controlled by means of suitable protective relays 10 and 11 respectively, which operate in response to abnormal circuit conditions such as reverse power flow above a predetermined minimum to trip open the associated network switch 6 or 7.

The distribution circuits 8 and 9 may also be supplied from a second supply circuit 12 by means of a feeder 13 and transformers 14 and 15 respectively. A circuit breaker for the feeder 13 is indicated diagrammatically at 16, and a pair of network switches, which may be similar to the network switches 6 and 7 are indicated at 17 and 18.

A pair of current transformers 19 and 20, are connected to be energized in accordance with the primary and secondary currents respectively of the transformer 3. The current transformers 19 and 20 have such relative transformation ratios, determined by the transformation ratio of transformer 3, that their secondary currents are equal for a given load on the transformer 3. The secondary windings of the current transformers 19 and 20 are connected in series in such relative direction that their secondary currents are in phase and co-incident during normal operation of the transformer 3. An over-current relay 21, which is connected to respond to the differential current of the secondary windings of the current transformers 19 and 20, is provided for operating the latch mechanism 22a of a switch 22.

The switch 22 is biased to closed position by any suitable means such as a spring 22b, but is normally held in open position against its bias, by the latch mechanism 22a. The contact members of the switch 22 are connected to establish any suitable artificial fault condition, such as a ground or short-circuit, on the feeder 1 when the switch 22 is closed.

The latch mechanism 22a may also be operated by means of a second over-current relay 23, similar to the relay 21, and energized in the same manner by means of a pair of current transformers 24 and 25 responsive to the primary and secondary currents respectively, of the transformer 4.

The trip coils of the network switches 6 and 7 and of the switch 22 may be supplied from any suitable source, which I have illustrated as a control bus 26, independent of the network system.

The over-current trip mechanism 5a of the circuit breaker 5 is designed to open the breaker in response to a current of predetermined value in the feeder 1, corresponding to power flow in excess of the rated capacity of both transformers 3 and 4. The power directional relays 10 and 11 may be adjusted to trip the network switches in response to reverse power equivalent to the exciting losses of the corresponding transformer 3 or 4, or may be adjusted to respond to a considerably higher value of reverse power, depending upon the type of distribution system to which the invention is to be applied.

The operation of the apparatus shown in Fig. 1 may be set forth as follows: Assuming that the supply circuits 2 and 12 are energized and the distribution circuits 8 and 9 are loaded, alternating currents of magnitude and power factor determined by the character of the connected load, the charging admittance of the feeders 1 and 13 and the exciting admittance of the transformers 3, 4, 14 and 15, flow from the supply circuits 2 and 12 to the feeders 1 and 13 in well known manner. The load currents drawn from the transformers 3, 4, 14 and 15 divide in a well known manner determined by the relative impedances of the various power paths from the point of consumption to the point of supply and the voltages and regulation characteristics of the sources.

The transformers 3, 4, 14 and 15 operate to dissipate their losses which may range from 2% rated capacity when the transformer is unloaded to a considerably higher percentage when it is loaded, as heat.

If a fault should develop in one of the transformers 3 or 4, at point X of transformer 3 for example, the power-directional relay 10 may or may not operate to open the network switch 6, depending upon whether or not the fault is of sufficient severity to cause reverse power in excess of the setting of relay 10 to flow from the distribution circuit 8 to the transformer 3. The circuit breaker 5 will not open unless the current in the feeder 1 is in excess of the rated capacity of both transformers 3 and 4. It will be apparent that if the load drawn by the distribution circuits 8 and 9 is low, the power flow to the fault may equal or exceed the rated capacity of both transformers 3 and 4, without causing the opening of circuit breaker 5.

Inasmuch as the power consumed by the fault appears as heat in the transformer 3, the latter may now be called upon to dissipate an amount of heat equivalent to 200% or more of its rated capacity, rather than the few percent representing losses during normal operation. Under these conditions, if no protective apparatus additional to the circuit breaker 5 and network switch 6 were provided, the transformer 3 would probably explode.

However, as the power consumed in the fault appears electrically as a difference between the primary current and the secondary current reduced to primary, of the transformer 3, an unbalanced condition of the secondary currents of current transformers 19 and 20 appears. As the unbalanced resultant of the secondary currents of current transformers 19 and 20 can flow only through the relay 21, the latter operates to release the latch mechanism of switch 22.

The switch 22 now closes to ground the feeder 1, and sufficient current flows through the feeder 1 to trip the breaker 5. Upon the grounding of feeder 1, the primary winding of transformer 3 is short-circuited and if the network switches 6 and 7 have not yet opened, sufficient reverse power flows to the transformer 3 to cause them to open.

As the flow of power from the supply circuit 2 to the transformer 3 is interrupted as soon as the switch 22 closes, it is immaterial whether the subsequent opening of the circuit breaker 5 is substantially instantaneous as would be the case with the apparatus shown, or involves a time element.

It is common practice in distribution systems of the type shown in Fig. 1, to burn out faults on the distribution circuits, such as 8 and 9. In order to accomplish this successfully, the full power capacity of all of the transformers should be available. However, when a fault exists on a distribution circuit 8 or 9, if there is a slight difference between the transformation ratios of current transformers 19 and 20 or 24 and 25, the heavy currents flowing through the transformers 3 or 4 may cause sufficient difference between the secondary currents of the current transformers to operate one of the relays 21 or 23 and thereby cause the feeder 1 to be grounded.

Figure 2:
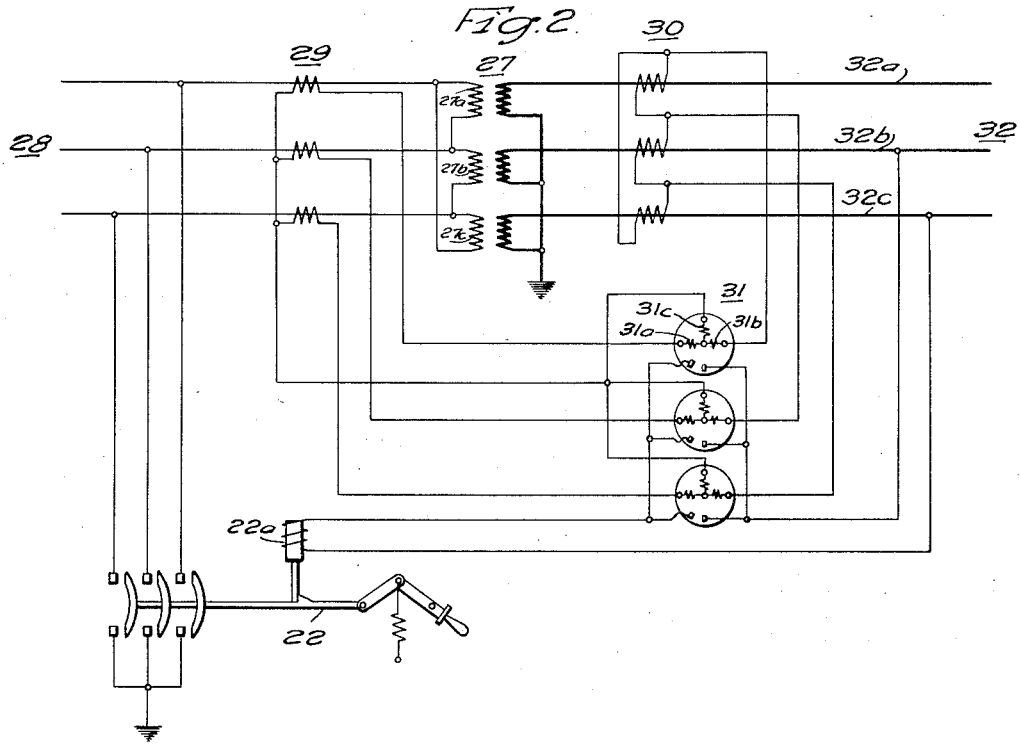
Figure 2 is a diagrammatic view illustrating an application of my invention to the protection of polyphase apparatus by means of ratio-differential relays.
Figure 3:
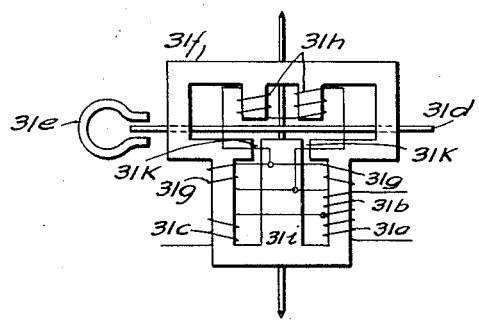
Fig. 3 is a diagrammatic view of the operator of a ratio-differential relay of the type shown in Fig. 2.

In order to avoid this difficulty, the latch mechanism 22a of the switch 22 may be controlled by means of ratio-differential relays such as illustrated in Figs. 2 and 3. Referring to Fig. 2 in detail, the primary windings of the individual transformers 27a, 27b, and 27c of a bank of transformers 27 are connected in delta to a three-phase feeder 28. The secondary windings of the transformers 27 are connected in grounded-neutral Y to the conductors 32a, 32b and 32c of a network 32.

A bank of current transformers 29, having their secondary windings connected in Y, are connected to be energized in accordance with the currents in the primary windings of transformers 27. A second bank of current transformers 30, having their secondary windings connected in delta, are connected to be energized in accordance with the currents in the secondary windings of the transformers 27.

The star points of the secondary windings of current transformers 29 are connected to a set of windings 31a of a set of three ratio-differential relays 31. The delta points of the secondary windings 30 are connected to a second set of windings 31b of the relays 31, and the neutral point of the Y-connected secondaries of current transformers 29 is connected to each of a set of differential windings 31c of the relays 31.

The contact members of the relays 31 are connected to control the latch mechanism 22a of the switch 22.

Assuming that the phase sequence of currents in the network 32 is as indicated by the subscripts $a$, $b$ and $c$, it may be seen from inspection of Fig. 2, that the current supplied to the winding 31a of the upper relay 31 is, because of the delta connection of the primaries of transformers 27, proportional to the resultant of $a$-phase secondary current and $c$-phase secondary current reversed. Similarly, the current supplied to the winding 31b of the upper relay 31 is, because of the delta connection of the secondaries of current transformers 30, proportional to the resultant of $a$-phase secondary current and $c$-phase secondary current reversed.

The currents in the windings 31a and 31b of the upper ratio differential relay 31 are, therefore, under normal conditions, in phase. Similar considerations apply to the two lower ratio-differential relays 31. The transformation ratios of the current transformers 29 and 30 are so chosen with reference to the transformation ratio of the transformers 27 that the currents in the windings 31a and 31b are equal as well as in phase during normal conditions.

Referring to Fig. 3, which shows diagrammatically an operator of one of the ratio-differential relays 31 of Fig. 2, an induction disc 31d is mounted in the usual manner to rotate between the poles of a drag magnet 31e and a driving magnet 31f. The differential winding 31c is mounted on an outer leg of the driving magnet 31f, and the windings 31a and 31b are both mounted on the other outer leg. A pair of windings 31g, are provided for obtaining a voltage proportional to the difference of fluxes in the two outer legs of the driving magnet 31f. A pair of windings 31h, energized in accordance with the differential voltage produced by the windings 31g, are provided for obtaining quadrature flux.

The driving magnet 31h is provided with a pole members 31i separated from the outer legs of the driving magnet by air gaps 31k.

The operation of the apparatus shown in Fig. 3 may be set forth as follows: As long as the currents in windings 31a and 31b are equal and in phase, no current flows through the winding 31c. The windings 31a and 31b operate to produce a flux, part of which follows the outer frame of the driving magnet 31f and part of which traverses the right air gap 31k and produces a flux in the pole member 31i. As part of the total flux is diverted through the pole member 31i, the flux values in the outer legs are not equal, and a voltage is induced in the right winding 31g slightly greater than the voltage induced in the left winding 31g. The winding 31h accordingly, operates to produce a quadrature flux. The relative direction of the flux produced in the pole member 31i and the quadrature flux is such that the torque on the disc 31d produced by their joint action tends to open the relay contact members (not shown).

It will be apparent that the biasing torque produced in the manner described above is proportional to the currents flowing in the windings 31a and 31b and is, therefore, greater when these currents are greater.

If the currents in the windings 31a become different in magnitude or phase relationship, an unbalanced resultant current flows in the winding 31c. This current produces a flux in the left outer leg of the driving magnet 31f which tends to induce a voltage in the left winding 31g greater than that induced in the right winding 31g. This action tends to reverse the direction of quadrature flux and produce a closing torque on the disc 31d. When the currents in windings 31a and 31b are small, a comparatively small current in the winding 31c operates to close the relay contact members, but when the currents in windings 31a and 31b are large, a larger differential current is necessary to operate the relay.

The operation of the apparatus shown in Fig. 2 will be apparent from the above. Upon the occurrence of a fault in one of the transformers 27, a differential current flows in one or more of the windings 31c causing operation of one or more of the relays 31 to trip the latch mechanism 22a and thereby close the switch 22.

If a fault occurs in the network 32, however, the biasing torque of all the relays 31 is increased, and slight differential currents in the windings 31c which may be caused by slight differences in the transformation ratios of the current transformers 29 and 30 fail to operate any of the relays 31.

Although I have shown the switch 22 of Fig. 2 as having three main contacts for establishing short-circuiting and ground connections for all phases of feeder 28, it will be apparent that some of these contacts and connections may be omitted. If the bank of transformers at the supply end of feeder 28 are connected in any grounded neutral arrangement, the feeder breaker may be tripped open by grounding one conductor of feeder 28, or by creating a phase-to-phase fault. With the primaries of transformers 27 connected in delta as shown, it is necessary to create a phase-to-phase fault on feeder 28 to open the network switch (not shown). Various other arrangements may be used depending upon the connections of the transformers of the system.

I do not intend that the present invention shall be restricted to the specific structural details, arrangement of parts or circuit connections herein set forth, as various modifications thereof may be effected without departing from the spirit and scope of my invention. I desire therefore, that only such limitations shall be imposed as are indicated in the appended claims.

I claim as my invention:

1. In a protective system, a feeder, a circuit breaker for interrupting the flow of power therethrough, means responsive to abnormal circuit conditions of said feeder for opening said breaker, a plurality of translating devices connected to said feeder including a transforming device and means responsive to an internal fault in said transforming device for establishing an abnormal circuit condition of said feeder to thereby open said breaker.

2. In a protective system, a feeder, a circuit breaker for interrupting the flow of power therethrough, means responsive to abnormal circuit conditions of said feeder for opening said breaker, a plurality of translating devices connected to said feeder including a transforming device having an input circuit and an output circuit and means responsive to differential action of the currents on said input and output circuits for establishing an abnormal circuit condition of said feeder in response to an internal fault in said transforming device, to thereby open said breaker.

3. In a protective system, a feeder, a circuit breaker for interrupting the flow of power therethrough, means responsive to an over-current condition of said feeder for opening said breaker, a plurality of translating devices connected to said feeder including a transforming device having an input circuit and an output circuit and means responsive to differential action of the currents in said input and output circuits for establishing an over-current condition in said feeder in response to an internal fault in said transforming device to thereby open said breaker.

4. In a protective system, an alternating-current supply circuit, a plurality of transformers, a feeder for transmitting power from said circuit to said transformers, a circuit breaker for interrupting the flow of power through said feeder, means responsive to abnormal circuit conditions of said feeder for opening said breaker and means responsve to an internal fault of one of said transformers for establishing an abnormal circuit condition in said feeder to thereby open said breaker.

5. In a protective system, an alternating-current supply circuit, a plurality of transformers, a feeder for transmitting power from said circuit to said transformers, said feeder having a ground return path, a circuit breaker for interrupting the flow of power through said feeder, fault responsive means effective upon grounding of said feeder to open said breaker, and means responsive to an internal fault of one of said transformers for grounding said feeder to thereby open said breaker.

6. In a protective system, an alternating-current supply circuit, a plurality of transformers, a feeder for transmitting power from said circuit to said transformers, a circuit breaker for interrupting the flow of power through said feeder, means responsive to an over-current condition of said feeder for opening said breaker, and means responsive to an internal fault of one of said transformers for short-circuiting said feeder to thereby open said breaker.

7. In a protective system, an alternating-current supply circuit, a plurality of transformers, a feeder for transmitting power from said circuit to said transformers, a circuit breaker for interrupting the flow of power through said feeder, means responsive to an over-current condition of said feeder for opening said breaker and means responsive to differential action of the primary and secondary currents of said transformer for short-circuiting said feeder in response to an internal fault in said transformer, to thereby open said breaker.

8. In a protective system, an electric circuit having a ground return path, a circuit breaker for interrupting the flow of power through said circuit, fault responsive means effective upon grounding of said circuit to open said breaker, a transforming device connected to said circuit, a switch for grounding said circuit, means for biasing said switch to closed position, latch mechanism for restraining said switch in open position and means responsive to an internal fault of said transforming device for tripping said latch mechanism to thereby ground said circuit and cause said circuit breaker to open.

9. In a protective system, a feeder, a circuit breaker for interrupting the flow of power therethrough, means responsive to abnormal circuit conditions of said feeder for opening said breaker, a distribution network, a plurality of transformers interconnecting said feeder and said network, network switches for controlling the flow of power between said transformers and said network, means responsive to reverse power for opening said network switches, and means responsive to an internal fault of one of said transformers for establishing an abnormal circuit condition of said feeder to thereby open said breaker and said network switches.

10. In a protective system, a feeder, a circuit breaker for interrupting the flow of power therethrough, means responsive to an over-current condition of said feeder for opening said breaker, a distribution network, a plurality of transformers interconnecting said feeder and said network, network switches for controlling the flow of power between said transformers and said network, means responsive to reverse power for opening said network switches, and means responsive to an internal fault of one of said transformers for establishing an over-current condition of said feeder and reverse power condition to said transformers to thereby open said breaker and said network switches.

11. In combination, a circuit having a source end and a load end, a circuit breaker in said circuit adjacent its source end, relay means for tripping said breaker when a fault occurs on said circuit, a voltage step-down transformer in said circuit adjacent its load end, and means responsive to a fault on a portion of said circuit between its load end and said transformer for producing an artificial fault on said circuit between said transformer and said circuit breaker.

12. In combination, a circuit having a source end and a load end, a circuit breaker in said circuit adjacent its source end, a voltage step-down transformer in said circuit between said circuit breaker and said load end, and means responsive to the difference between the current input and current output of said transformer for producing a fault on said circuit between said transformer and said circuit breaker for causing the tripping of said circuit breaker.

SHIRLEY L. GOLDSBOROUGH.